June 10, 1947.  R. A. KROPP  2,422,023
TREAD PLATE
Filed May 7, 1945
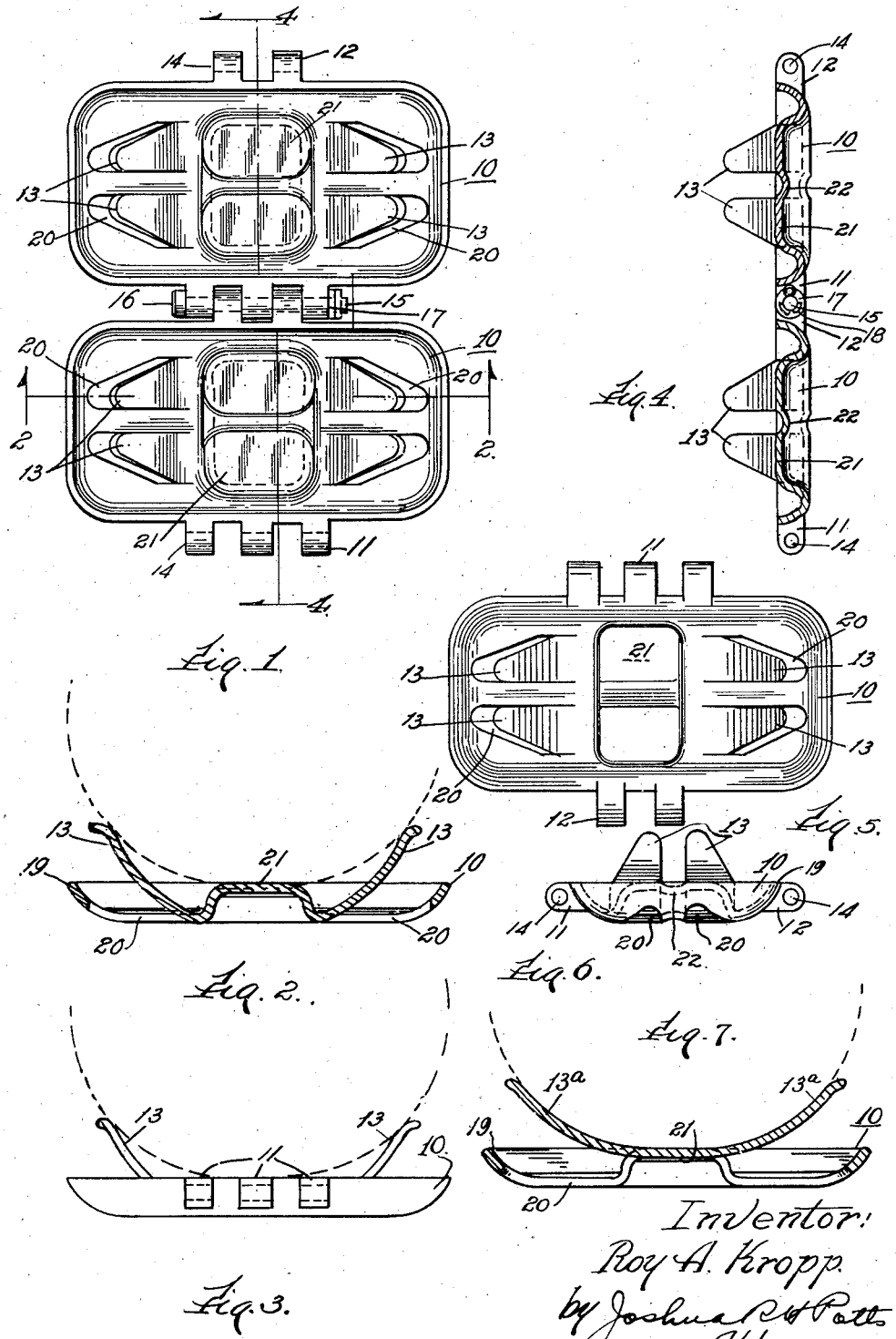
Inventor:
Roy A. Kropp.
by Joshua R H Potts
Attorney Patented June 10, 1947

2,422,023

UNITED STATES PATENT OFFICE 2,422,023

TREAD PLATE

Roy A. Kropp, River Forest, Ill., assignor to Kropp Forge Company, Cicero, Ill., a corporation of Illinois Application May 7, 1945, Serial No. 592,426

3 Claims. (Cl. 152—226)

This invention relates to improvements in tire treads and the like.

An object of the invention is to provide a tread having improved guiding means for retaining tires on treads.

Another object has been to provide an improved tread having guiding means for retaining standard tires thereon.

Another object has been to provide a tread constructed in such a manner as should diminish breakage.

Another object has been to provide a tread which is as practicable as possible.

According to my invention I have provided a tread having guiding means preferably struck up out of the tread, with the tread preferably in one piece, and with the edges constructed so as to be turned upwardly to diminish breakage.

Further objects and advantages will appear and be brought out more fully in the following specification, reference being had to the accompanying drawing, in which:

Fig. 1 is a top view of the tread.
Fig. 2 is a section on the line 2—2 of Fig. 1.
Fig. 3 is a side view of a tread.
Fig. 4 is a section on the line 4—4 of Fig. 1.
Fig. 5 is a bottom view, and
Fig. 6 is an end view.
Fig. 7 is a modified form of device shown in Fig. 1.

Referring to the drawing in detail, in which I have illustrated the preferred form of my invention, I have shown a tread 10, having bosses 11 and 12 and lugs 13.

The bosses 11 and 12 are formed with apertures 14 to act as hinges in combination with pins 15, having heads 16, as will be apparent without further description to those skilled in the art.

A pair of treads is shown joined in Fig. 1, illustrating two of the apertured bosses being joined by a pin 15, with the pin being held in place by the head on one end and the washer 17 and cotter pin 18 on the other end.

The tread may be made from a unitary blank, and the lugs 13 may be struck upwardly from the blank to form guides for the tires to retain the tires upon the tread, as clearly illustrated in Fig. 2.

These lugs may, if desired, be used to pinch the tires or be positioned otherwise in retaining or guiding relation to the tires.

The treads are rounded at the edges, as at 19, in order to reduce breakage.

When the lugs 13 are struck up from the blank there results an aperture 20, which serves among other things to reduce the weight of the tread.

Because of this upwardly turned edge 19 of the tread, it has been found that breakage is substantially diminished.

The tire is adapted to rest on the flat portions 21, which may be separated by ribs 22, the ribs giving additional strength to the treads.

It is believed that the invention will be clear to those skilled in the art without further description.

Fig. 7 shows a modified form of the tread shown in Fig. 1. In this form, the lug 13a is also struck up from the blank, but it is struck up directly from the flat raised portion 21 in such a manner as to conform to the tire instead of being struck up from the downwardly bent portion as in Fig. 1.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. A tread for tires of motor vehicle wheels comprising a saucer-like, rectangular-shaped plate having hinge elements on opposite sides and prongs extending from the inner face thereof, characterized in that the prongs are located in the intermediate part thereof and positioned for contact with the opposite sides of a tire, against which the tread is positioned.

2. A tread for tires of motor vehicle wheels comprising a saucer-like, rectangular-shaped plate having hinge elements on opposite sides and prongs extending from an indented area in the inner face thereof, characterized in that the prongs are located in the intermediate part thereof and positioned for contact with the opposite sides of a tire, against which the tread is positioned.

3. A tread for tires of motor vehicle wheels comprising a saucer-like, rectangular-shaped plate having hinge elements on opposite sides and prongs extending from the inner face thereof, said prongs struck from the said plate providing openings through the plate, characterized in that the prongs are located in the intermediate part thereof and positioned for contact with the opposite sides of a tire, against which the tread is positioned.

ROY A. KROPP.

REFERENCES CITED

The following references are of record in the file of this patent:

UNITED STATES PATENTS

| Number | Name | Date |
|---|---|---|
| 1,679,270 | Rolka | July 31, 1928 |
| 1,051,472 | Weed | Jan. 28, 1913 |
| 1,653,781 | Reger | Dec. 27, 1927 |

FOREIGN PATENTS

| Number | Country | Date |
|---|---|---|
| 481,005 | France | 1916 |